(12) United States Patent
Chow

(10) Patent No.: US 6,804,234 B1
(45) Date of Patent: Oct. 12, 2004

(54) EXTERNAL CPU ASSIST WHEN PEFORMING A NETWORK ADDRESS LOOKUP

(75) Inventor: Peter Ka-Fai Chow, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 813 days.

(21) Appl. No.: 09/809,016

(22) Filed: Mar. 16, 2001

(51) Int. Cl.[7] .............................................. H04L 12/56
(52) U.S. Cl. ...................................... 370/389; 370/429
(58) Field of Search ................................ 370/356, 389, 370/428, 429, 458, 469, 415, 395.32, 395.7; 709/236

(56) References Cited

U.S. PATENT DOCUMENTS

| | | | |
|---|---|---|---|
| 6,335,938 B1 * | 1/2002 | Chiang et al. | ............... 370/458 |
| 6,460,088 B1 * | 10/2002 | Merchant | ..................... 370/356 |
| 6,463,032 B1 * | 10/2002 | Lau et al. | .................... 370/428 |
| 6,463,478 B1 * | 10/2002 | Lau et al. | .................... 709/236 |
| 6,480,490 B1 * | 11/2002 | Merchant et al. | ........... 370/389 |
| 6,529,503 B1 * | 3/2003 | Chiang et al. | ............... 370/429 |
| 6,574,240 B1 * | 6/2003 | Tzeng | ........................ 370/469 |
| 6,577,636 B1 * | 6/2003 | Sang et al. | ............... 370/395.7 |
| 6,584,106 B1 * | 6/2003 | Merchant et al. | ...... 370/395.32 |
| 6,636,523 B1 * | 10/2003 | Lau et al. | .................... 370/415 |
| 6,658,015 B1 * | 12/2003 | Merchant et al. | ........... 370/428 |
| 6,731,596 B1 * | 5/2004 | Chiang et al. | ............... 370/429 |
| 6,732,184 B1 * | 5/2004 | Merchant et al. | ........ 370/395.7 |

* cited by examiner

Primary Examiner—Salvatore Cangialosi
(74) Attorney, Agent, or Firm—Harrity & Snyder LLP

(57) ABSTRACT

A multiport switching device includes an Internal Rules Checker (IRC) that determines forwarding information for packets received at the device. The IRC uses an internal address lookup table to determine the forwarding information when the received packet conforms to version four of the Internet Protocol (IPv4). When the received packet has a longer destination address, consistent with version six of the Internet Protocol (IPv6), the IRC uses an externally located CPU to assist the IRC in determining the forwarding information.

19 Claims, 3 Drawing Sheets

EXTERNAL CPU ASSIST WHEN PEFORMING A NETWORK ADDRESS LOOKUP

BACKGROUND OF THE INVENTION

1. Technical Field

The present invention relates generally to switching in a packet switched network and, more specifically, to systems and methods for looking up destination addresses in a switch of a packet-switched network.

2. Background Art

At the heart of most networks are switches interconnected via a communications medium. For example, Ethernet is a commonly used local area network scheme in which multiple stations are connected to a single shared serial data path. These stations communicate with a switch located between the shared data path and the stations connected to that path. The switch controls the communication of data packets on the network.

Networks are frequently organized into sub-networks, called subnets. Within a single subnet, packets of information may be directed to their destination devices using a layer 2 Media Access Control (MAC) address that identifies the attached Ethernet devices. When a switch receives a packet with a familiar destination MAC address, it forwards the packet to the output port on the switch that is associated with the MAC address.

Packets transmitted between layer 2 subnets do so using the destination device's IP (Internet Protocol) layer 3 address. More particularly, a transmitting device sending a packet to a destination device outside of the transmitting device's subnet first determines, using the IP layer 3 address, the layer 2 MAC address of a gateway router that bridges the subnets. The gateway router, upon receiving the packet, performs address translation, which involves stripping the MAC destination address of the router and inserting a new MAC destination address that corresponds to the MAC address of the destination device in the destination subnet. The router determines the MAC address to substitute based on the IP address.

Current IP switching techniques are based on version four of the IP ("IPv4") protocol. More recently, a newer version of the IP protocol, version six ("IPv6"), has been proposed. One of the differences in IPv6 relative to IPv4 is that IPv6 uses longer address fields, thus allowing networks to have a larger number of uniquely addressable devices.

One difficulty caused by the longer address fields in IPv6 is that certain registers in layer 3 switches that were designed for IPv4 are not large enough to handle the larger IPv6 addresses. For example, a layer 3 switch implementing IPv4 may use an internal address table that assigns 32 bits for each address compared to the 128 bits required by IPv6 addresses. This is not a problem as long as the layer 3 switch transmits packets within a subnet because, in this situation, the switch only uses the MAC destination addresses. However, when transmitting the packets between different subnets, the switch uses the 128-bit IPv6 address, which may be incompatible with switches designed around the IPv4 protocol. Modifying the layer 3 switch to be able to handle the IPv6 addresses can require substantial design changes, which may undesirably add to the cost of the switch.

Thus, there is a need in the art to improve layer 3 switches to be able to handle the larger addresses used in IPv6 while minimizing changes to the layer 3 switch.

SUMMARY OF THE INVENTION

Advantages of the invention will be set forth in part in the description which follows, and in part will be obvious from the description, or may be learned by practice of the invention. The advantages of the invention will be realized and attained by means of the elements and combinations particularly pointed out in the appended claims.

According to one aspect of the present invention, a multiport network device comprises a receiver and a transmitter. An internal rules checker is coupled to an output of the receiver. The internal rules checker generates a forwarding descriptor, based on header information of packets in the network, that identifies transmit ports for the packets. The internal rules checker includes a rules queue configured to receive the header information for the packet and a first address lookup table configured to store associations between destination addresses and transmit ports, the rules queue and the first address table being implemented within a single integrated circuit. The internal rules checker generates the forwarding descriptor for the packet by looking up the destination address of the packet in the first address table when the destination address is an address associated with a first protocol and the internal rules checker generates the forwarding descriptor for the packet by looking up the destination address for the packet in a second address table, implemented externally to the integrated circuit, when the destination address is an address associated with a second protocol.

A method consistent with the present invention is a method of processing packets in a network device. The method comprises receiving a packet at one of a plurality of receive ports in the network device, the packet having header information that includes at least an intended destination address for the packet. The method includes determining, by an internal rules checker, a forwarding descriptor for the packet that identifies transmit ports to output the packet from the network device. The forwarding descriptor is determined for the packet by looking up the destination address of the packet in a first address lookup table when the destination address is an address associated with a first protocol, the first address lookup table being implemented in an integrated circuit. Additionally, the method includes determining, by the internal rules checker, the forwarding descriptor for the packet by looking up the destination address for the packet in a second address table, implemented externally to the integrated circuit, when the destination address is an address associated with a second protocol.

BRIEF DESCRIPTION OF THE DRAWINGS

The accompanying drawings, which are incorporated in and constitute a part of this specification, illustrate an embodiment of the invention and, together with the description, explain the invention. In the drawings.

BEST MODE FOR CARRYING OUT THE INVENTION

Figure 1:
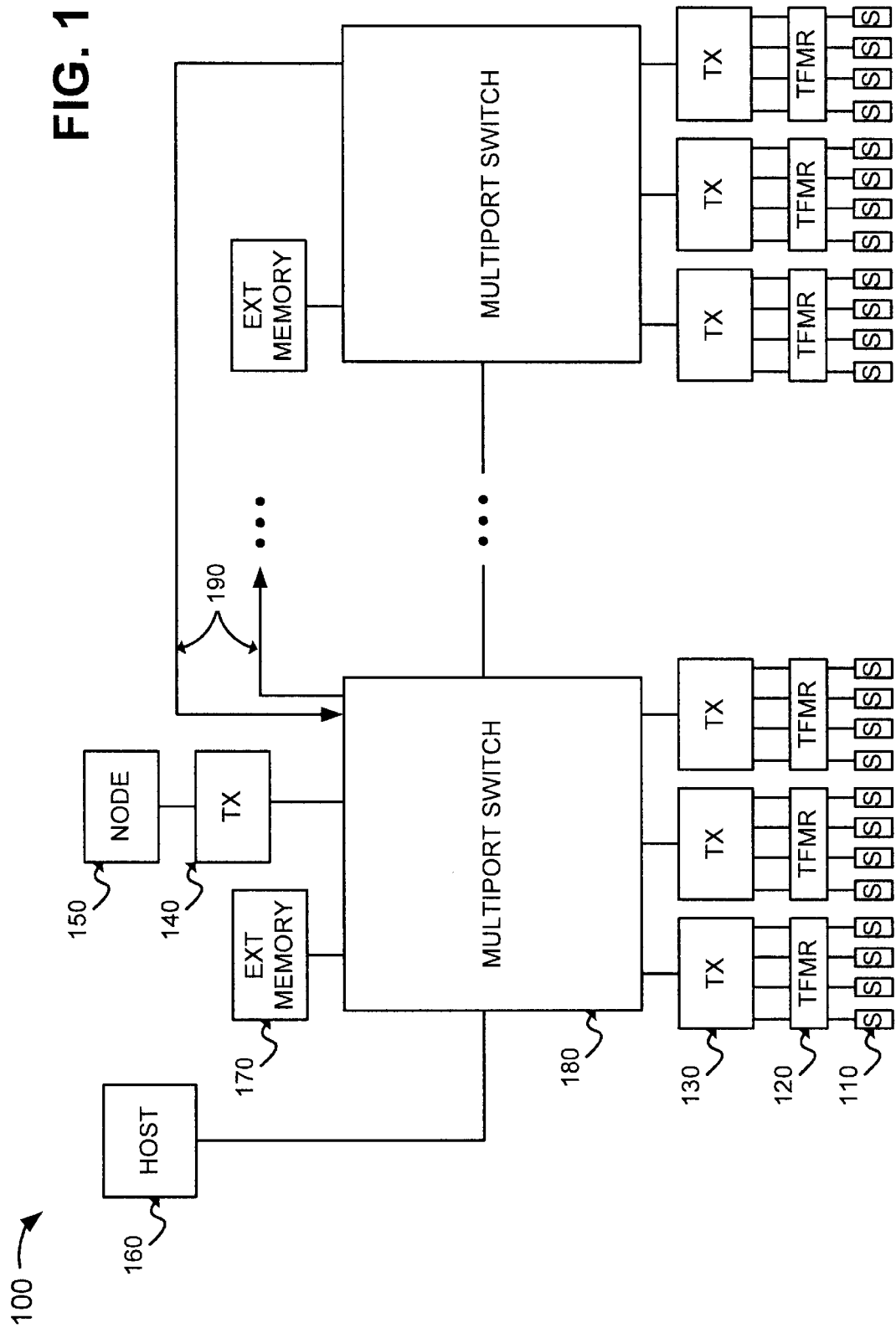
FIG. 1 is a block diagram of an exemplary system in which systems and methods consistent with the present invention may be implemented.

The following detailed description of the invention refers to the accompanying drawings. Like objects in the drawings may be referred to using the same reference numeral in different drawings. The detailed description does not limit the invention. Instead, the scope of the invention is defined by the appended claims and equivalents.

As described herein, a switch determines forwarding information for received packets. In determining the forwarding information, the switch examines the protocol used by the packet. If the switch can not handle the packet using its basic circuitry, such as, for example, packets using the IPv6 protocol, the switch uses an external CPU to assist it in determining the forwarding information.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
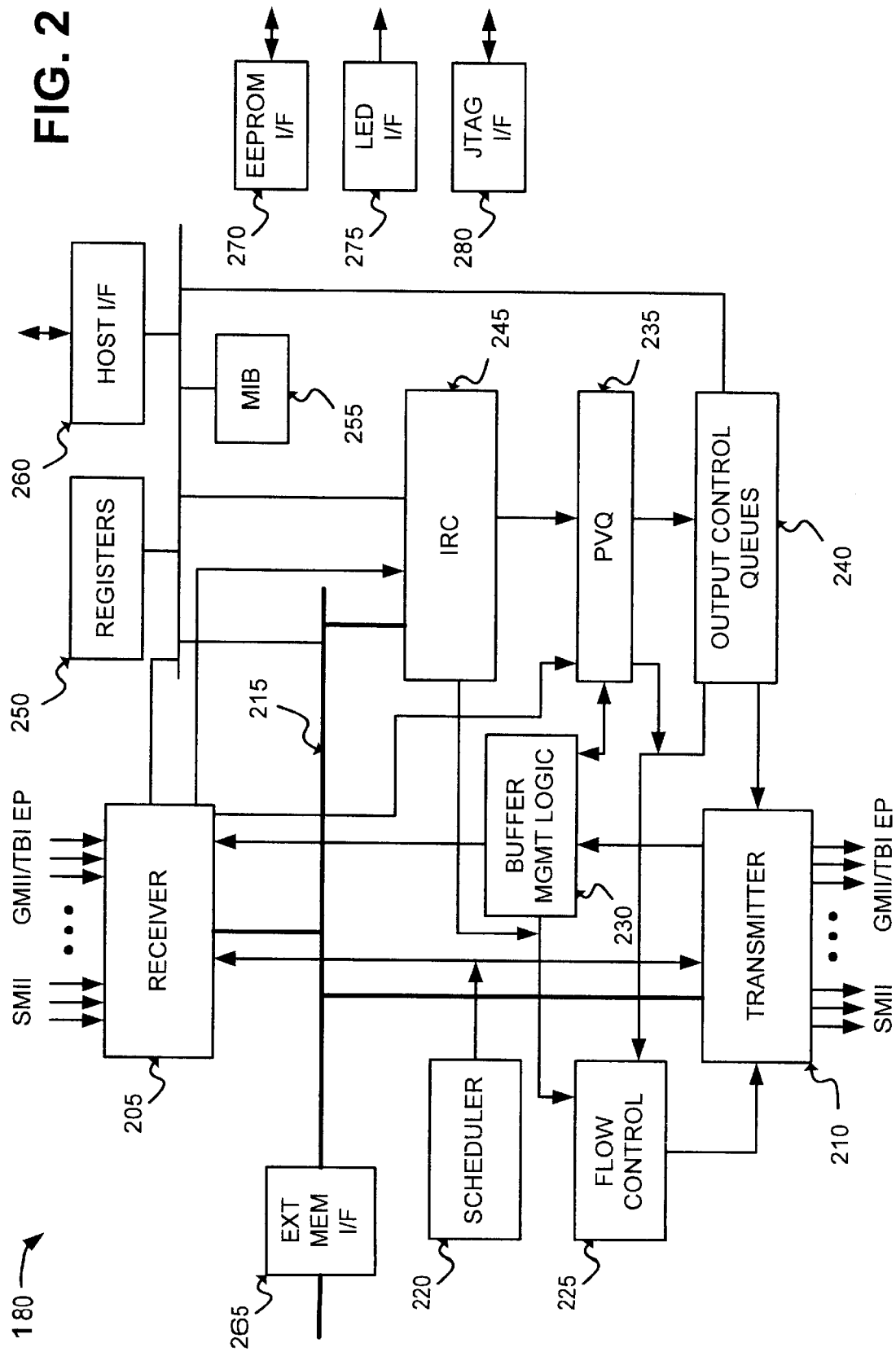
FIG. 2 is a detailed diagram of a multiport switch according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10,100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

Figure 3:
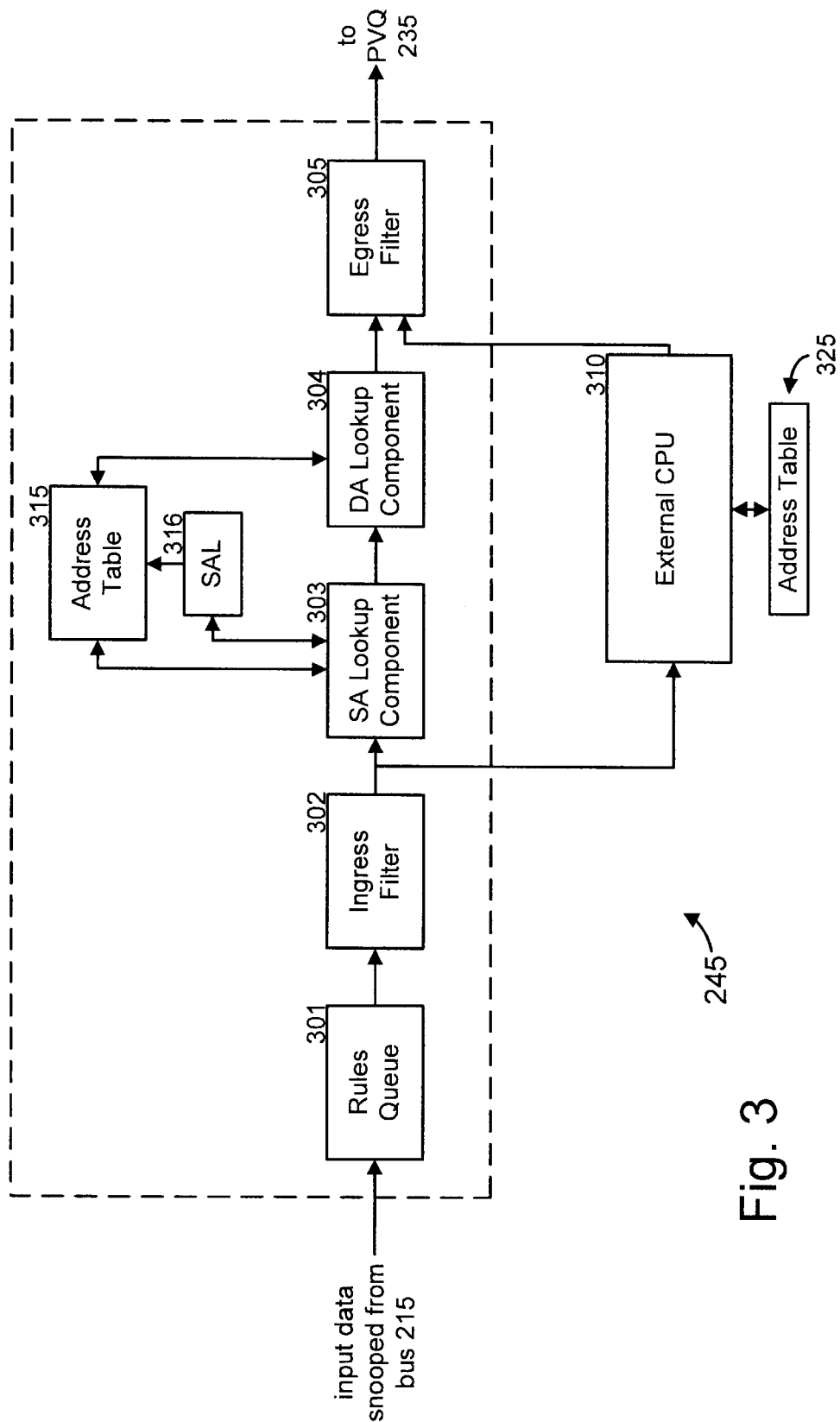
FIG. 3 is an exemplary diagram illustrating details of the internal rules checking circuit shown in FIG. 2.

FIG. 3 a diagram illustrating an exemplary implementation of IRC 245 consistent with the present invention. IRC 245 includes serially coupled rules queue 301, ingress filter 302, source address (SA) lookup component 303, destination address (DA) lookup component 304, and egress filter 305. Additionally, address table 315 and source address learning (SAL) engine 316 are implemented in parallel to the SA lookup component 303 and DA lookup component 304. A CPU 310 is implemented in parallel to the SA lookup component 303 and the egress filter 305. The CPU 310 may be implemented external to the integrated circuit semiconductor chip on which other components of IRC 245 are located. CPU 310 assists SA lookup component 303 and DA lookup component 304 in looking up destination address of input packets that use the IPv6 protocol.

SA lookup component 303 and DA lookup component 304 may access address table 315 in determining a forwarding descriptor. As previously discussed, the forwarding descriptors for a packet contains information on how the transmitter 210 should transmit the packet. Each forwarding descriptor includes at least a port vector field that identifies the transmit ports associated with the packet in transmitter 210 and a frame pointer that references the body of the packet in external memory 170. Additionally, when switching across subnets, SA lookup component 303 and DA lookup component 304 may also determine a new MAC destination address for the destination device in the next subnet. Under IPv6, the new MAC destination address is based on the 128-bit IP address, but on only a 32-bit IP address in IPv4, Entries in address table 315 are updated by source address learning (SAL) engine 316, as described in more detail below.

Address table 315, as mentioned previously, stores associations between a frame's header information and its transmit port(s). In normal operation with packets conforming to the IPv4protocol, packet header information enters IRC 245 at rules queue 301, and flows through ingress filter 302, SA lookup component 303, DA lookup component 304, and egress filter 305 in a pipelined fashion. Thus, while SA lookup component 303 is processing a packet's header, the previous packet header may be being processed by DA lookup component 304 and the succeeding frame header may be being processed by ingress filter 302.

Rules queue 301 may capture the packet header information for both IPv4 and IPv6packets by "snooping" on bus 215 to capture the header information as it is being transferred to external memory 170. Ingress filter 302 next examines the captured data and applies predetermined rules to determine, for example, whether the packet was received with errors. IPv4 based packets are next passed to the SA lookup component 303, which uses address table 315 to keep track of active source addresses. IPv6 packets, however, may be passed to external CPU 310, as described in more detail below.

When the packet is an IPv4 packet, SA lookup component 303 queries address table 315 for an entry that corresponds to the source address field of the packet. If the address table 315 "knows" the source address (i.e., if an entry corresponding to the source address field has been previously written to address table 315), the packet is passed to the DA lookup component 304. If the entry is not in address table 315, SA lookup component 303 initiates a "learn" operation by SAL 316, which responds by flooding the packet to all possible output ports of the multiport switch. When an indication of the correct output port(s) is subsequently received back by the IRC 245, SAL 316 appropriately updates address table 315 to indicate that the packet's source address has been learned and to include the correct output port(s) for the destination address of the packet.

Address table 315 may be implemented as a table containing an array of entries, such as 4096 entries. Each entry is written to the address table 315 at a table row address determined by a hashing function. If multiple table entries hash to the same table row, a pointer in the table row may be set to refer to the location of the additional entries. More specifically, SA lookup component 303 and DA lookup component 304 determine the correct row in address table 315 to access by hashing a value based on the source and/or destination MAC addresses captured by the rules queue 301. A hash function, in general, generates an output value within a certain range based on an input value. For example, a hash function consistent with the present invention generates a 10 bit output value (i.e., a value between 0 and 1023) based on an input MAC address. The output hash value is then directly used to address one of 1024 table entries in address table 605. The other 3072 entries in address table 315 (assuming the address table is implemented with 4096 total rows) may be used to store "collision" entries that occur when multiple entries hash to the same row address. Other information, in addition to the MAC address, such as the VLAN Index, may be concatenated with the MAC addresses and used as the input to the hash function.

DA lookup component 304, after receiving a packet from SA lookup component 303, retrieves the output port vector field from address table 315. The forwarding descriptors (i.e., the output port vectors, frame pointers, and potentially a new MAC destination address) output from DA lookup component 304 are forwarded to egress filter 305 and then to PVQ 235. Egress filter 305 may implement exit policy checking, check the VLAN member set for each transmit port, and construct the forwarding descriptor that is passed to the PVQ 235.

Operation of IRC 245 when processing IPv6 based packets is similar to the above-discussed operation when processing IPv4 based packets, except that external CPU 310 performs the functions previously performed by the SA lookup component 303, DA lookup component 304, address table 315, and SAL 316. More specifically, when a IPv6 packet is received by ingress filter 302, the ingress filter detects that the packet is an IPv6 packet. For example, the ingree filter may examine the address fields in the header of the packet to determine that the packet is an IPv6 packet. The ingress filter 302 may then transmit the IPv6 packet, and receives the IPv6 IP destination address, the frame pointer, and the MAC destination address to external CPU 302. Under IPv6, the IP destination address is a 128-bit address, which may be too large for processing by SA lookup component 303, DA lookup component 304, address table 315, and SAL 316. External CPU 310 performs the functions of these components by generating the appropriate port vector(s), frame pointer, and new MAC destination address. This forwarding descriptor information is input to egress filter 305. From the point of view of egress filter 305, the forwarding descriptor from external CPU 310 has the same format as the forwarding descriptor from DA lookup component 304.

External CPU 310 stores an address table, labeled as address table 325, to thereby allow CPU 310 to lookup data forwarding information associated with the input IPv6 packets. If the IPv6 IP destination address is not within address table 325, CPU 310 initiates a learn operation to learn the correct entry for the address table 325. Address table 325 may be structurally similar to address table 315, although address table 325 will have longer entries to accommodate the longer address fields in IPv6.

As described above, an external CPU is implemented to assist the native source address and destination address lookup components in an IRC. The external CPU helps to extend the functionality of the IRC in the face of newer protocols while requiring relatively few modifications to the IRC.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

The scope of the invention is defined by the claims and their equivalents.

What is claimed is:

1. A multiport network device comprising:
   a receiver configured to receive information packets from a network, each of the packets having header information that includes at least a destination field indicating an intended destination address for the packet;
   a transmitter configured to transmit the packets to the network through a plurality of transmit ports; and
   an internal rules checker coupled to an output of the receiver, the internal rules checker generating a forwarding descriptor, based on the header information, that identifies the transmit ports for the packet, the internal rules checker including a rules queue configured to receive the header information for the packet and a first address lookup table configured to store associations between destination addresses and transmit ports, the rules queue and the first address lookup table being implemented within a single integrated circuit, the internal rules checker generating the forwarding descriptor for the packet by looking up the destination address of the packet in the first address lookup table when the destination address is an address associated with a first protocol and the internal rules checker generating the forwarding descriptor for the packet by looking up the destination address for the packet in a second address table, implemented externally to the integrated circuit, when the destination address is an address associated with a second protocol.

2. The multiport network device of claim 1, wherein the first protocol is version four of the Internet Protocol and the second protocol is version six of the Internet Protocol.

3. The multiport network device of claim 1, wherein the internal rules checker further includes:
   a source address lookup component configured to receive the header information from the rules queue, the source address lookup component keeping track of active packet addresses in the first address table; and
   a destination address lookup component configured to receive the header information from the source address lookup component, the destination address lookup component configured to identify at least one transmit ports associated with a packet from the first address table.

4. The multiport network device of claim 3, wherein the internal rules checker further includes:
   a source address learning engine coupled to the source address lookup component and the first address table, the source address learning engine updating the first address lookup table in response to requests from the source address learning engine.

5. The multiport network device of claim 4, wherein the internal rules checker additionally includes:
   a CPU implemented externally to the integrated circuit, the CPU accessing and maintaining the second address lookup table.

6. The multiport network device of claim 5, wherein the internal rules checker further comprises:
   an egress filter connected to an output of the destination address lookup component and receiving the forwarding descriptor from one of the first address table and the external CPU, the egress filter transmitting the received forwarding descriptor to at least one transmit port.

7. The multiport network device of claim 1, further comprising:
   a bus; and
   a memory coupled to the receiver and the transmitter through the bus, the memory storing the received packets and forwarding the stored packets to the transmitter;
   wherein the rules queue receives the header information by snooping on the bus and capturing the header information in response thereto.

8. The multiport network device of claim 1, wherein the network device is a layer 3 switch.

9. A method of processing packets in a network device comprising:
   receiving a packet at one of a plurality of receive ports in the network device, the packet having header information that includes at least an intended destination address for the packet;
   determining, by an internal rules checker, a forwarding descriptor for the packet that identifies transmit ports to output the packet from the network device, the forwarding descriptor being determined for the packet by looking up the destination address of the packet in a first address lookup table when the destination address is an address associated with a first protocol, the first address lookup table being implemented in an integrated circuit;
   determining, by the internal rules checker, the forwarding descriptor for the packet by looking up the destination address for the packet in a second address lookup table, implemented externally to the integrated circuit, when the destination address is an address associated with a second protocol; and
   transmitting the packet from the at least one transmit port identified by the forwarding descriptor.

10. The method of claim 9, wherein the first protocol is version four of the Internet Protocol and the second protocol is version six of the Internet Protocol.

11. The method of claim 9, wherein the network device is a layer 3 switch.

12. The method of claim 9, wherein determining the forwarding descriptor for the packet by looking up the destination address for the packet in the second address lookup table further includes using an external CPU to access and maintain the second address lookup table.

13. The method of claim 9, wherein the forwarding descriptor determined using one of the first and second address tables have identical formats.

14. A network switch for routing packets received in a packet-switched network comprising:
   means for receiving the packets from the network, each of the packets having header information that includes at least a destination field indicating an intended destination address for the packet;
   a rules queue for capturing the header information received by the means for receiving;
   a first address lookup table for storing associations between destination addresses and transmit ports of the network switch, the first address lookup table being used to generate a forwarding descriptor for the packet when the destination address is an address associated with a first protocol;

an external CPU for generating the forwarding descriptor for the packet when the destination address is an address associated with a second protocol; and transmit means for transmitting the packet from the transmit ports indicated by the forwarding descriptor generated by either the first address lookup table or the external CPU.

15. The network switch of claim 14, further comprising:

an external address lookup table connected to the external CPU, the external address lookup table storing associations between destination addresses of the second protocol and the transmit port of the network switch.

16. The network switch of claim 15, wherein when the external address lookup table does not contain the destination address corresponding to the packet of the second protocol, the external CPU initiates an operation to learn the destination address from the network.

17. The network switch of claim 14, wherein the forwarding descriptor identifies the transmit ports for the packets.

18. The network switch of claim 14, further comprising:

a bus; and a memory connected to the means for receiving and the transmit means through the bus, the memory storing the received packets and forwarding the stored packets to the transmit means;

wherein the rules queue receives the header information by snooping on the bus and capturing the header information in response thereto.

19. The network switch of claim 14, wherein the network switch is a layer 3 switch.

* * * * *